(12) United States Patent
Heidasch et al.

(10) Patent No.: US 9,098,806 B2
(45) Date of Patent: Aug. 4, 2015

(54) PERSONALIZED CONTROLS FOR A SEMANTIC SYSTEM UTILIZING A CENTRAL AND A LOCAL SEMANTIC NETWORK

(71) Applicants: SAP SE, Walldorf (DE); intelligent views gmbh, Darmstadt (DE)

(72) Inventors: Robert Heidasch, Speyer (DE); Archim Heimann, Wiesloch (DE); Nico Licht, Heidelberg (DE); Klaus Reichenberger, Frankfurt (DE); Thomas Pohl, Leimen (DE); Stefan Scheidl, Speyer (DE); Stephan Brand, Wiesloch (DE); Steffen Moldaner, Riedstadt (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 0 days.

(21) Appl. No.: 14/530,418

(22) Filed: Oct. 31, 2014

(65) Prior Publication Data
US 2015/0052085 A1 Feb. 19, 2015

Related U.S. Application Data

(63) Continuation of application No. 13/444,351, filed on Apr. 11, 2012, now abandoned.

(51) Int. Cl.
| | |
|---|---|
| *G06N 5/02* | (2006.01) |
| *G09B 7/04* | (2006.01) |
| *G06N 5/04* | (2006.01) |
| *G06F 17/30* | (2006.01) |

(52) U.S. Cl.
CPC ............ *G06N 5/02* (2013.01); *G06F 17/30731* (2013.01); *G06N 5/04* (2013.01); *G09B 7/04* (2013.01)

(58) Field of Classification Search
None
See application file for complete search history.

(56) References Cited

U.S. PATENT DOCUMENTS

| | | |
|---|---|---|
| 7,870,117 B1 | 1/2011 | Rennison |
| 2008/0243480 A1 | 10/2008 | Bartz et al. |
| 2011/0213804 A1 | 9/2011 | Lee et al. |
| 2011/0264697 A1 | 10/2011 | Latzina et al. |
| 2013/0067430 A1 | 3/2013 | Mayer-Ullmann |
| 2013/0073546 A1 | 3/2013 | Yan et al. |

OTHER PUBLICATIONS

Ahu Sieg et al., "Web search personalization with ontological user profiles", Proceedings of the sixteenth ACM Conference on Information and Knowledge Management, CIKM '07, Jan. 1, 2007, pp. 525-534.*

* cited by examiner

*Primary Examiner* — Jeffrey A Gaffin
*Assistant Examiner* — Robert H Bejcek, II
(74) *Attorney, Agent, or Firm* — Kenyon & Kenyon LLP (57) ABSTRACT

A method, machine readable storage medium, and system for providing personalized semantic controls for semantic systems. A semantic network may be set up with initial configuration. A business application user interface, including semantic controls, may be coupled to the semantic network to interact with the semantic network. Semantic objects and relations may be defined in the semantic network for business terminology. A user request for business data may be received. The semantic network may update the objects and relations for business terminology based on the request. The business application user interface may provide for personalized semantic controls based on the updated objects and relations.

17 Claims, 5 Drawing Sheets

PERSONALIZED CONTROLS FOR A SEMANTIC SYSTEM UTILIZING A CENTRAL AND A LOCAL SEMANTIC NETWORK

CROSS-REFERENCE TO RELATED APPLICATIONS

This application is a continuation of U.S. patent application Ser. No. 13/444,351, filed Apr. 11, 2012, and is related to U.S. patent applications: Ser. No. 13/050,092, entitled BUSINESS SEMANTIC NETWORK BUILDER, filed Mar. 17, 2011; Ser. No. 13/050,333, entitled SEMANTIC PHRASE SUGGESTION ENGINE, filed Mar. 17, 2011; Ser. No. 13/149,036, entitled SEMANTIC TERMINOLOGY IMPORTER, filed May 31, 2011; Ser. No. 13/217,732, entitled SELF-LEARNING SEMANTIC SEARCH ENGINE, filed Aug. 25, 2011. The contents of all these applications are incorporated herein by reference in their entirety.

BACKGROUND

A semantic network is a network that represents semantic relations among terms (e.g., concepts). A semantic network may be used as a form of knowledge representation, and therefore may be used to model business knowledge in companies and their various parts, for example, as enterprise knowledge and/or terminology.

Knowledge may be organized and belong to the same knowledge area or expertise area, for example: IT, finance, etc. The knowledge area or expertise area may be grouped into knowledge domains and may be used to specify the context of the required information and therefore deliver data with better quality. Typically the business knowledge and the terminology used are distributed throughout the entire company, experts within the company, management heads, and large volumes of documents, etc.

Modern business applications are built from business objects that group or encapsulate the definition of relevant business information. A business object structural model may contain one root node and zero to many business object nodes. The node's hierarchy (i.e., tree) may be built using associations between business object nodes that group semantically related attributes. Additionally, each attribute may be structurally defined by an underlying global data type—so-called element data type or global data type (centrally defined data type). Finally, the instances of business objects provide business-related terminology, e.g. a material business object provides the definition of material and the material names used and defined in a particular company.

Business-related terminology may evolve over time with new business trends, changing or discontinued product-lines, new technology, or any of a number of business, economic, social, and/or technology related changes. Given the ever-changing nature of business-related terminology, what is needed are controls for a semantic network that will adapt with usage to provide for better user/user-group-oriented interaction with the semantic network.

DETAILED DESCRIPTION

Embodiments of the present invention may provide business applications that provide personalized semantic controls for semantic systems. A business application presentation layer may provide front-end controls for users to interact with back-end business application functional layers. Business application presentation layers may include rich client applications ("RCAs"), which may provide developers various controls and/or graphical tools to design and build user interfaces ("UIs") for the front-end presentation layers. Business application UIs may include graphical UIs or speech-based UIs. The functional layers can include semantic networks, learnable contextual networks, semantic search engines, semantic phrase suggestion engines, or any other similarly functional semantic system. In various embodiments, semantic systems may include "knowledge packages" to model, update, and/or create new business terminology for a company.

In one embodiment, the business terminology may be updated on a contextual basis. A semantic system may personalize user interaction or control of business application UIs by updating business terminology used in the UIs based on semantic relations. For example, business information and/or terminology may be updated based on a business context as determined by a business object ("BO") definition and further updated based on a user semantic context as determined by user business roles, e.g. management versus staff for a given business group. Thus, business information may be represented through a semantic network that allows defining the terms in a context-sensitive way. The integration of the terminology analysis, user context (e.g. preferences, business roles, etc.), and/or contextual learning processes may extend and/or enhance the lexicon of business terms in business application UIs.

Embodiments of the present invention may provide for group-specific or user-specific business terminology to build objects and relations for business terminology. New terms, detected through analyses of existing documents/business data may be used to build objects and relations for such new terminology. User interactions may allow for creation of optimized user-oriented "knowledge views" or personalized semantic controls of a business application UI. For example, when a user within a particular business group may interact with documents/data, a local semantic network (e.g., local to a client computing device) may use this interaction to create user preferences (business-related user context) as part of semantic indexes. Thus, embodiments of the present invention may provide a better understanding of business user needs by providing more precise business information when a user interacts with business data, or starts business applications or transactions, etc. Further, embodiments of the present invention may be used to build/provide to a business user an intelligent application that helps to better consume business terminology and data that may spread-out through a whole company (i.e., across multiple business groups, user-groups, etc.).

Embodiments of the present invention may provide for parallel semantic systems to update terminology for control of business application UIs. One system may be a local semantic network running on a client terminal of an end-user. Another system may be a central semantic network, remote from an end-user, which may gather and update business terminology across an entire company, including different business groups or sub-groups, user-groups, business roles, etc. Yet another system may be a learnable contextual network ("LCN"). An LCN may provide mechanisms including neural networks and/or statistical modeling networks to learn and adapt contextual usage for personalized semantic controls for business terminology as such terminology may evolve within a company, its business units, or business organizations, which may wholly be referred to herein as an "enterprise."

Figure 1:
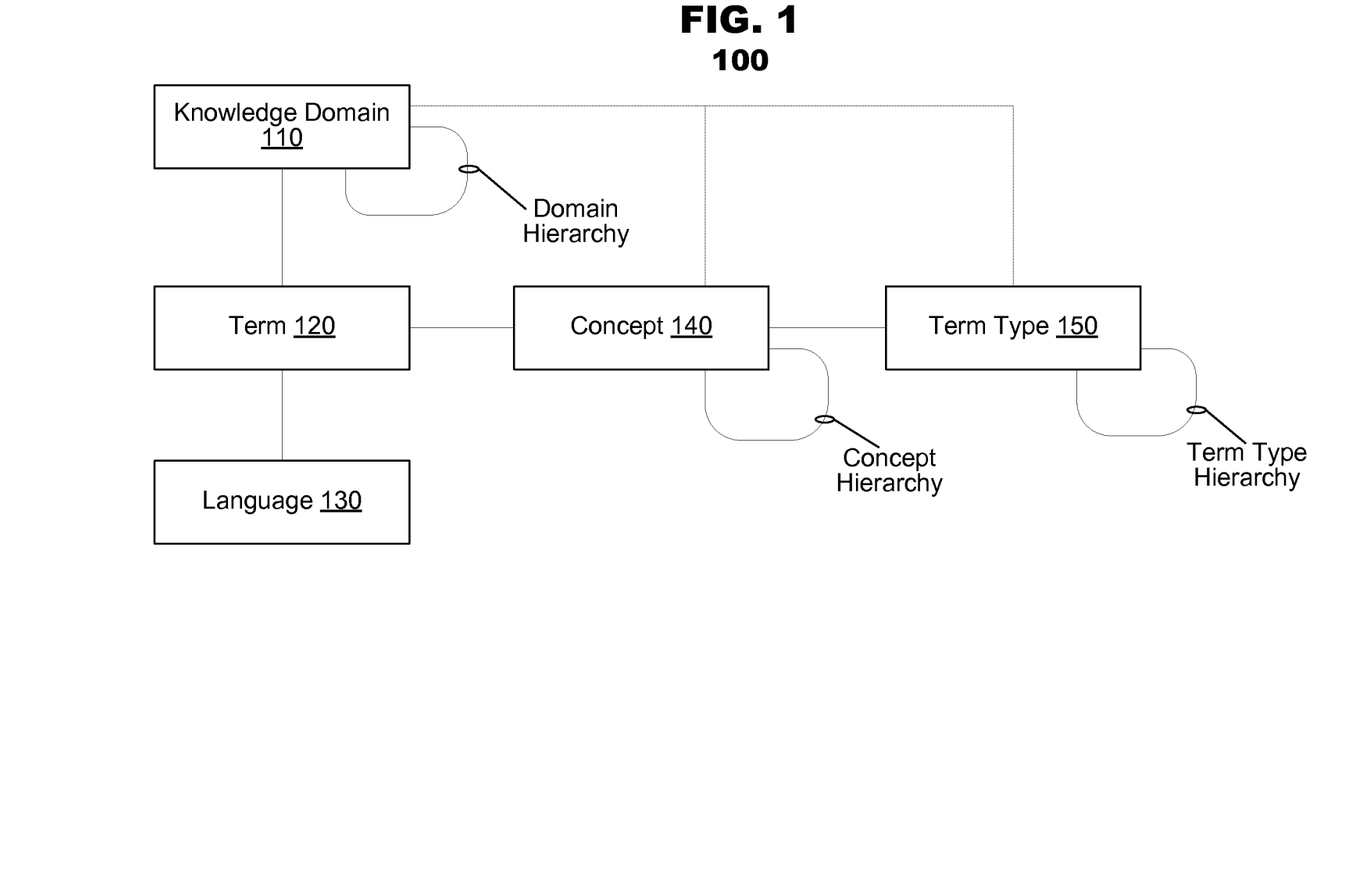
FIG. 1 illustrates a block diagram of an exemplary knowledge package for a semantic network according to an embodiment of the present invention.

FIG. 1 illustrates a block diagram of an exemplary knowledge package 100 for a semantic network according to an embodiment of the present invention. The knowledge package 100 may include one or more knowledge domains 110, one or more terms 120, or one or more languages 130. The terms 120 may be defined based on one or more concepts 140. The terms 120 and concepts 140 may be further defined based on one or more term types 150. The knowledge domains 110 may be organized in a hierarchical manner representing different levels of an enterprise. One or more terms 120 may be defined within the knowledge domains 110. A plurality of terms may be collected and defined or organized (e.g., as in a term list) in a repository for the knowledge package 100.

As noted, the terms 120 may be defined based on one or more concepts 140. The concepts 140 may indicate the context or usage for the terms 120. For example, the knowledge package may maintain an importance indicator for a term 120 as the term may be used in relation to certain concepts 140. As some terms 120 may be used more often in relation to certain concepts 140, the knowledge package 100 may update the importance indicator to indicate the relationship between certain terms 120 and concepts 140. In various embodiments, the terms 120 and concepts 140 may be defined based on relationships within various knowledge domains 110. Thus, a knowledge package 100 may provide extensible role-based knowledge representation among users and user-groups for an enterprise, as will be described in further detail herein.

The terms 120 may be further defined based on term types 150. Term types 150 may include grammar-related definitions (e.g., noun, verb, adjective, etc.) based on usage of a term 120 in a sentence or phrase. Term types 150 may also define the usage or context of a term 120, which may allow for classification of the term.

In one embodiment, the knowledge package 100 may be used for modeling knowledge representations for semantic networks across an enterprise. In another embodiment, the knowledge package 100 may be used to model local user-knowledge for an end-user. Thus, knowledge packages 100 may provide mechanisms to form extensible knowledge representations throughout departments, business units, or roles throughout an enterprise. For example, a term "driver" can be used, among other things, to describe a tool, a person, or a computer program. The term may further be used in various phrases such as "impact driver," "truck driver," or "device driver." Thus, the term may be used in many different contexts throughout an enterprise. Implementation of knowledge packages 100 in various semantic systems may provide mechanisms to the update, store, and adapt business terminology as represented through different business units, user-roles, and user-group roles within an enterprise. In turn, controls for the semantic systems may be modified based on context for an end-user.

Figure 2:
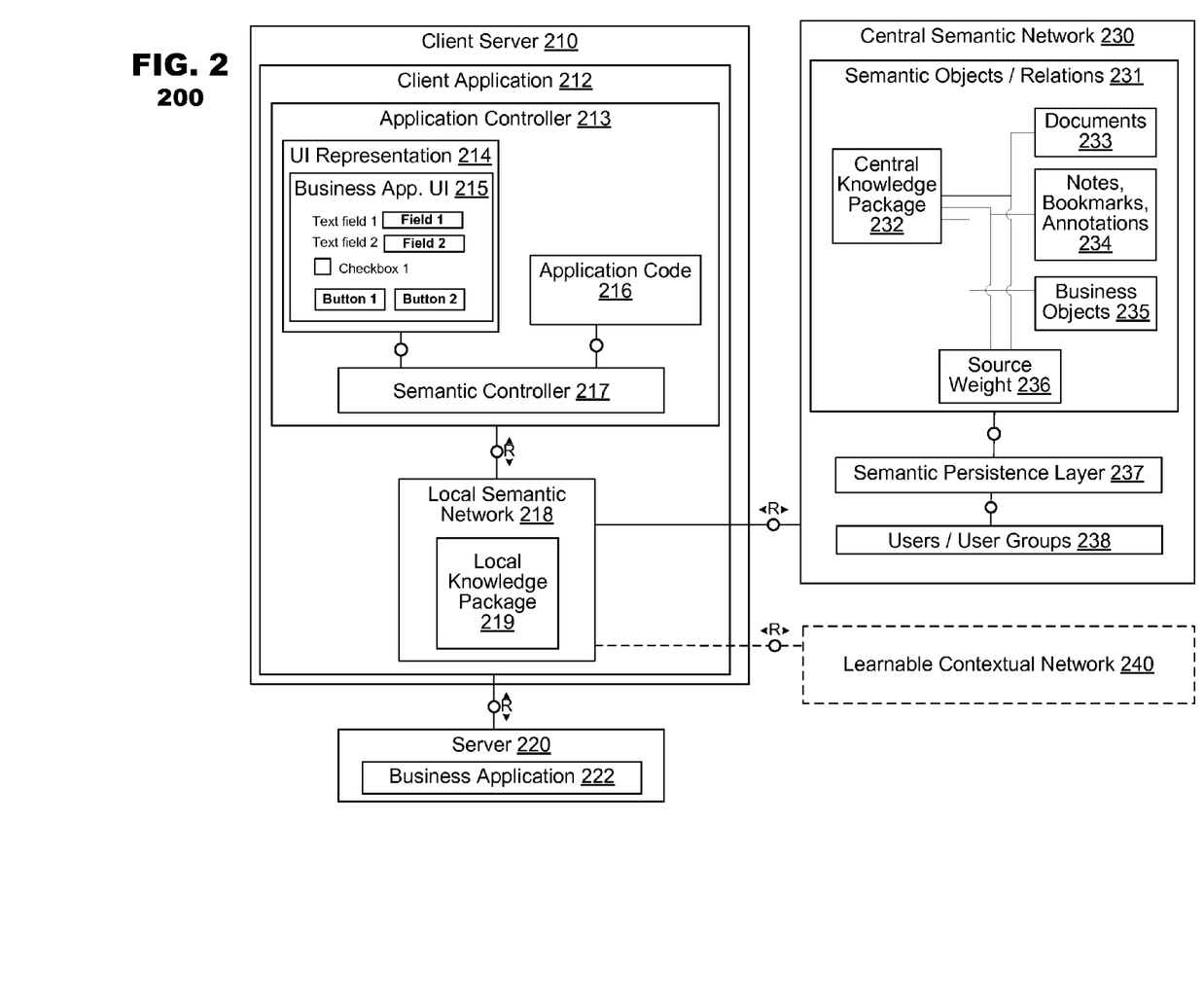
FIG. 2 illustrates a block diagram of a system for providing a personalized semantic controls for a semantic system according to an embodiment of the present invention.

FIG. 2 illustrates a block diagram of a system 200 for providing personalized semantic controls for a semantic system according to an embodiment of the present invention. The system 200 may include a client server 210 to implement a client application 212, a server 220 to implement one or more business applications 222, and a central semantic network 230 to maintain semantic objects and/or relations 231 for business data. The client application 212 may include a controller 213 to control a UI representation 214, which may include a business application UI 215. The business application UI 215 may be linked to co-located application code 216 within the controller 213. The UI representation 214 and corresponding application code 216 may be linked to a semantic controller 217. The client application 212 may be further linked to the server 220, which may provide further functionality for the business application UI 215 via the one or more business applications 222.

The client application 212 may include a co-located local semantic network 218 including a knowledge package 219. The semantic controller 217 may link controls and/or displays of the business application UI 215 with business terminology (e.g., names, phrases, ID's, descriptions, values, etc.). For example, the business application UI 215 may include one or more text fields, shown here as "Text field 1" corresponding to "Field 1" and "Text field 2" corresponding to "Field 2," one or more checkboxes, shown here as "Checkbox 1," and one or more buttons, shown here as "Button 1" and "Button 2." During development, a designer may assign certain business terminology with the text fields, checkboxes, buttons, etc. During runtime, the semantic controller 217 may build links to or "consume" the business terminology using a terminology manager (not shown), the local semantic network 218, and/or the central semantic network 230.

The central semantic network 230 may include semantic objects and/or relations 231 and a central knowledge package 232. The central knowledge package 232 and semantic objects and/or relations 231 may be used for building business and user context for business terminology and/or data based on documents 233, notes, bookmarks, and/or annotations 234, and business objects 235 (i.e., encapsulated business functionality). The business terminology for an enterprise may be weighted based on a source weight 236 that may assign a weighting to business terminology based on user/user-group usage, manipulation of data and/or business terminology, the source of business terminology (e.g., promotional materials, sales reports, shipping reports, etc.) and/or statistical modeling of business terminology as related to phrases, sentences, etc.

The semantic objects and/or relations 231 may be linked to a semantic persistence layer 237 which may be linked to various users/user-groups 238 within an enterprise. The semantic persistence layer 237 may generate and maintain tables (not shown) of business terminology as related to users/user groups 238, which may provide additional extensibility to update semantic relationships for business terminology across an enterprise.

During development, a designer may create one or more business terms for an enterprise and assign definitions to the terms. A designer may also import business terminology and semantic objects and relations into the central semantic network 230 to further create and define terms for an enterprise. The central semantic network may consume the imported terminology and semantic objects and relations to build one or more business application UIs (e.g., business application UI 215).

In various embodiments, the enterprise-level encapsulation of business terminology for users/user groups 238 within the central semantic network 230 as well as user-level encapsulation of business terminology through the local semantic network 218 may provide multiple levels of extensibility to update and/or evolve the business terminology within an enterprise. For example, the local semantic network 218 for a user, say User A may be updated for terminology most often used by User A; the local knowledge package 219 may relate context, concepts, types, and domains for the terminology as used by User A. For example, the local semantic network 218 may provide for updating business terminology displayed in controls of the business application UI 215 for User A based on usage.

For example, User A may be a shipping clerk responsible for shipping tools to customers and the business application UI 215 may be a shipping form. The clerk may input tool types to ship to customers in the Text fields 1 and 2. In an embodiment, the local semantic network 218 may maintain business terminology for the clerk as related to tool types for entering into the text fields. In another embodiment, the local semantic network 218 may maintain tool types that may be shipped to particular customers. To enter a tool type to be shipped, say an "impact driver," the clerk, in an exemplary manner, may right-click on Field 1 to see a list of tool types to enter into the field. The list may be populated, in alphabetic order, with "impact driver," "pneumatic driver," or "rivet driver." The clerk may select an appropriate tool for filling-in Field 1. In this exemplary manner, the system 200 may provide for personalized semantic controls as related to tool types that the shipping clerk most often ships.

In another example, say a particular customer may receive "pneumatic drivers" as opposed to "impact drivers." As noted, the local semantic network 218 may provide for relationship extensibility for business terminology. In this example, when the clerk may right-click on Field 1, the tools may be displayed with "pneumatic driver" at the top of the list rather than "impact driver." In this exemplary manner, the semantic system 200 may provide for personalized semantic controls as related to tool types that the shipping clerk ships as well as customer preferences.

In another example, information (context, concept, domain, type, phrases, etc.) for the terminology used by User A may be communicated to the central semantic network 230, which may manage similar relationships for the terminology on an enterprise level. The central semantic network 230 may identify particular terminology that may be often used by a group of users in a similar role or department as User A (e.g., other shipping clerks). Or, in another example, updating terms for promotional materials to be sent to particular customers which marketing managers may incorporate into such promotional materials.

In an embodiment, the central semantic network 230 may measure a frequency of usage for particular terms for the roles and/or departments. In another embodiment, the central semantic network 230 measure a frequency of phrases used in conjunction with the terminology. In yet another embodiment, the central semantic network 230 may measure a number of annotations, notes, or bookmarks 234 the terminology across various documents 233 and/or business objects 235 for the roles and/or departments. Using measurements of such embodiments, the central semantic network 230 adapt and/or update objects and/or relations for the terminology throughout an enterprise.

Therefore, in one embodiment, data stored in the central semantic network 230 and may be used to improve access and understanding of existing information and/or terminology. As such, when an end-user consumes this data and works with it (e.g., accesses the data via the business application UI 215 or any business application coupled to the central semantic network 230 in a business application specific context), the central semantic network 230 may generate context-related information associated with the data to improve the semantics objects and relations 231. Thus, the semantic networks 218, 230 may build and update context sensitive data from any existing knowledge, user interactions, and business relations (e.g., roles).

The semantic system 200 may also provide for building and/or updating relationships and/or objects for business terminology across parallel networks. In one embodiment, the system 200 may include a learnable contextual network 240 ("LCN"). The LCN 240 may include a neural network or similar analytical engine to learn business terminology contextual relationships and usage.

Figure 3:
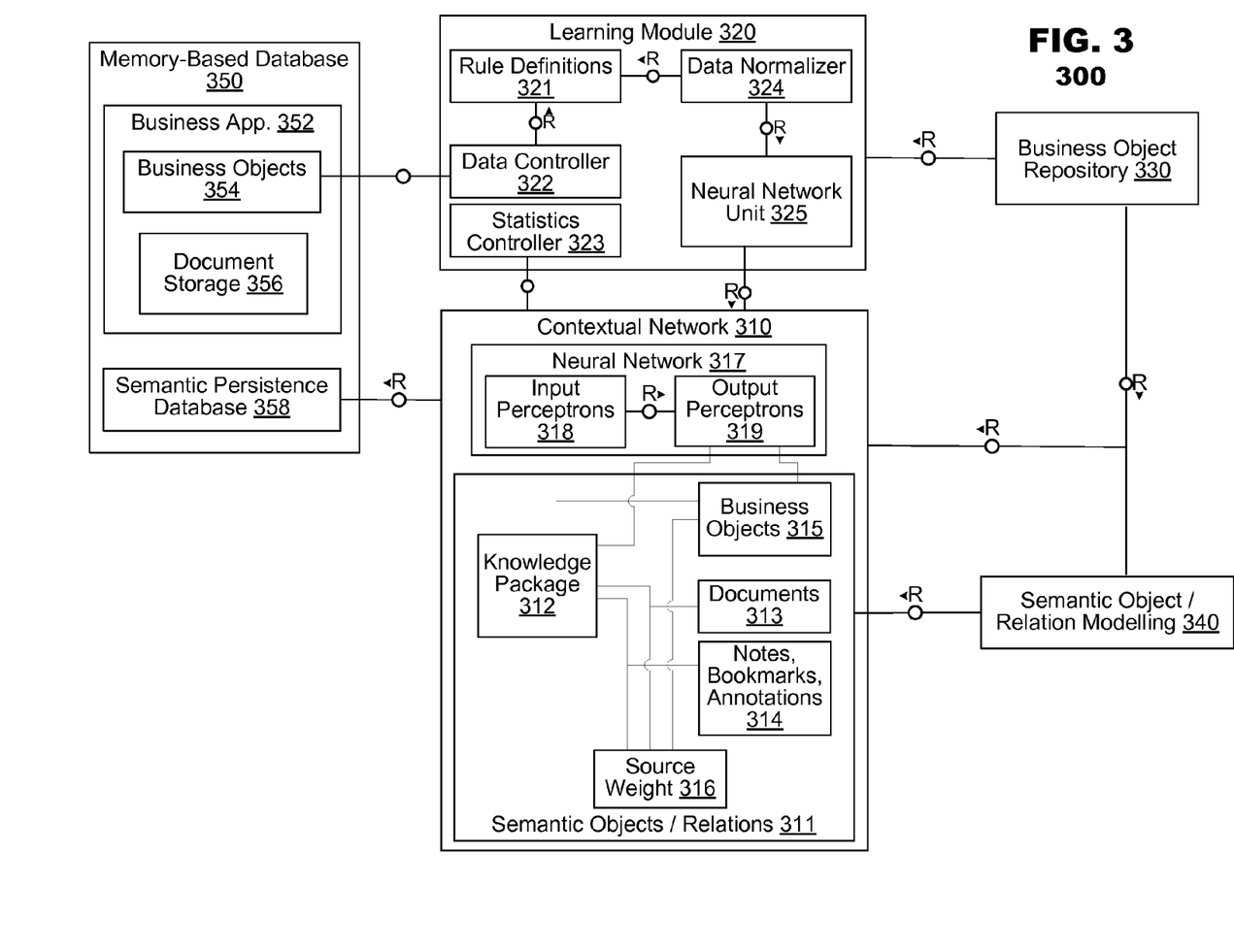
FIG. 3 illustrates a block diagram of a learnable contextual network for use with embodiments of the present invention.

FIG. 3 illustrates a learnable contextual network 300 for use with embodiments of the present invention. The LCN 300 may include a contextual network 310, a learning module 320, a business object repository 330, a semantic object and relation modeling unit 340, and a memory-based database 350. The contextual network 310 may include semantic objects and relations 311 which may manage business terminology through a knowledge package 312, documents 313, notes, bookmarks, and annotations 314, business objects 315, and source weighting 316. The contextual network 310 may include a neural network 317 having input perceptrons 318 and output perceptrons 319, which may provide for optimizing the semantic objects and/or relations 311 for business terminology.

The business object repository 330 may include encapsulated business functionalities such as service repositories, resource planning repositories, runtime data repositories, etc. The memory-based database 350 may provide a semantic persistence database 358 and in-memory software functionality for managing one or more business applications 352. The business applications 352 may comprise business objects 354 and document storage 356.

The LCN 300 may provide for extensible modeling, management, and updating of business terminology through coupling of the contextual network 310 to the learning module 320. Further extensibility may be provided through coupling the contextual network 310 to the semantic persistence database 358, the business object repository 330, and the semantic object relation modeling unit 340.

The learning module 320 may include rule definitions 321, a data controller 322, a statistics controller 323, a data normalizer 324, and a neural network unit 325. The learning module 320 may learn, update, manage, and/or adapt business terminology using the neural network unit 325. The neural network unit 325 may optimize the creation and/or updating of the input and output perceptrons 318, 319 for the neural network 317 based on contextual relationships of business terminology as calculated via the rule definitions 321, the data normalizer 324, and the statistics controller 323.

The learning module 320 may be coupled to the business object repository 330 to provide for learning and managing business terminology throughout various functional levels of an enterprise. The data controller 322 may be coupled to the business objects 354 to provide the learning module 320 the capability to learn and manage business terminology as used through in-memory applications and/or functions for an enterprise.

In various embodiments, the LCN 300 may extend the semantic relations for business terminology based on cyclical updates of the input/output perceptrons 318, 319 of the neural network 317. Thus, the contextual relationships of business terminology for users/user-groups, roles, departments, and/or business units may optimally evolve with usage throughout an enterprise. In various embodiments, other parallel networks may be incorporated into the semantic system 200 of FIG. 2 to provide for building and/or updating relationships and/or objects for business terminology. These may include semantic search engines, self-learning semantic search engines, and/or semantic phrase suggestion engines.

Figure 4:
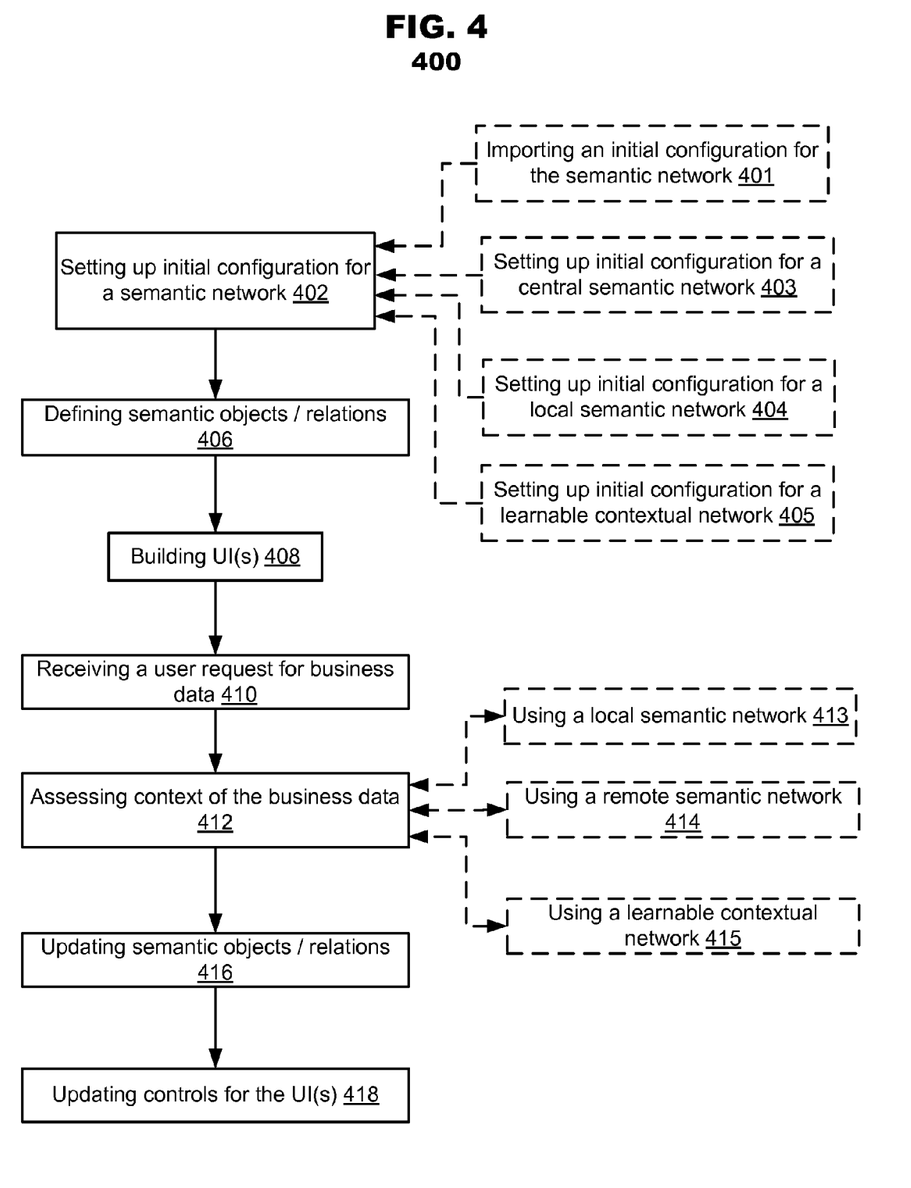
FIG. 4 illustrates a method for providing a personalized semantic controls for a semantic system according to an embodiment of the present invention.

FIG. 4 illustrates a method 400 for providing personalized semantic controls according to an embodiment of the present invention. A computer processor may be configured to execute program instructions to perform the method 400. At step 402, the method 400 may set-up an initial configuration for a semantic network. The set-up may include establishing terms, concepts, term types, and/or an initial set of knowledge domains based on relationship mapping between source structures (business objects and the objects' elements) for the semantic network.

In an embodiment, the method 400 may import terminologies and semantic definitions unique to an enterprise (step 401). In an embodiment, the method 400 may set-up an initial configuration for a central semantic network remote from an end-user (step 403). In an embodiment, the method 400 may set-up an initial configuration for a local semantic network for an end-user (step 404). In an embodiment, the method 400 may set-up an initial configuration for a learnable contextual network remote from an end-user (step 405).

At step 406, the method 400 may define semantic objects and/or relations for the terminologies and/or data, also referred to as "building links" for terminologies and/or data. The method may build links for objects and relations from existing business documents, notes, annotations, bookmarks, business objects, etc. At step 408, the method 400 may build one or more user interfaces ("UIs") having updatable controls for accessing the central semantic network. The UI may be a desktop application UI, a business application UI, a web based UI, or a speech based UI.

At step 410, the method 400 may receive a request for business data at a UI entered by a user. At step 412, the method 400 may assess the context of the business data within the user request. In an embodiment, the method 400 may assess the context with a semantic network co-located with the UI (step 413). In another embodiment, the method 400 may dispatch the request to a central semantic network remote from the UI to assess the business data (step 414). In yet another embodiment, the method 400 may dispatch the request to a network remote from the UI to assess the business data (step 415).

In an embodiment, the context may be assessed based on business terms, phrases, or sentences input into the UI via a keyboard or spoken into the UI. In another embodiment, the context may be assessed based on a role of the user or a user-group association for the user. In yet another embodiment, the context may be assessed based on preferences of the user.

At step 416, the method 400 may update the objects and relations for the business term(s) based on the context. In an embodiment, the objects and relations may be updated for the local semantic network. In another embodiment, the objects and relations may be updated for the central semantic network. In yet another embodiment, the objects and relations may be updated through a learnable contextual network.

At step 418, the method 400 may update controls for the user's UI based on the updated objects and relations for the business term(s). In an embodiment, the method 400 may create new business terms to update controls for the user's UI.

Figure 5:
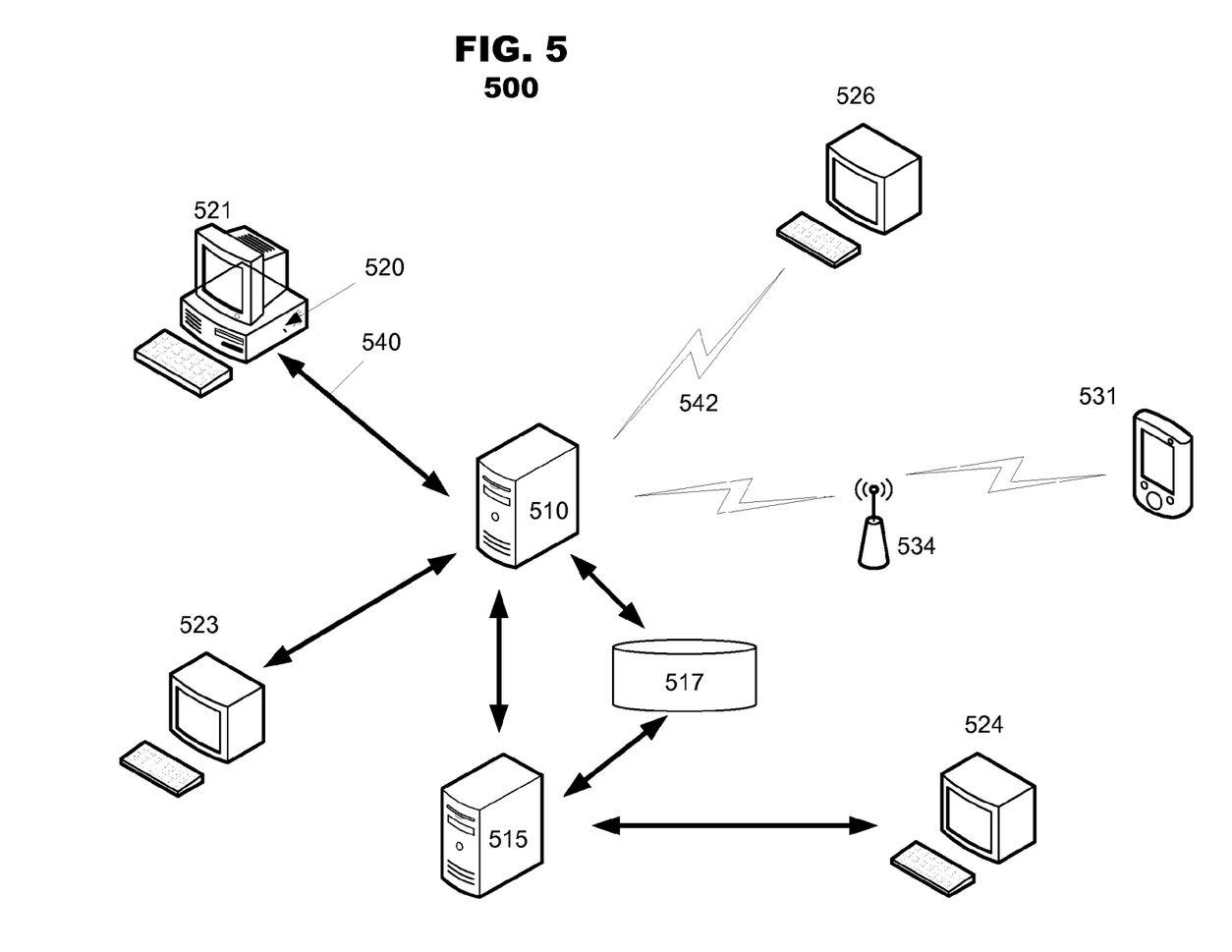
FIG. 5 illustrates a hardware configuration for implementing a system according to an embodiment of the present invention.

FIG. 5 illustrates an exemplary hardware configuration for implementing a system 500 according to an embodiment of the present invention. The system 500 may comprise one or more networked servers 510 and 515, one or more client terminals 521, 523, 524 and 526, data storage devices 517, wired and wireless communication links 540 and 542, wireless access point 534, and a portable device(s) 531. The one or more networked servers 510 and 515 may execute a multi-application software system. The servers 510 and 515 may include processor(s), internal memory and related computer program instructions (all not shown).

The server 510 and/or 515 may execute on a processor a semantic network (as described with respect to FIG. 2) that facilitates provision of a personalized semantic controls including data communications and transfers between the networked servers 510 and 515, and the client terminals 521, 523, 524 and 526, and/or portable device(s) 531 over wired or wireless communication paths. The server 510 may access data storage device(s) 517 that store machine-readable software instructions that may be accessed and executed by the processor(s) of the server 510.

The data storage device(s) 517 also may store data related to the operation of an enterprise including data generated by the semantic network and/or parallel semantic networks. The data storage device 517 that may be a hard disk drive, non-volatile memory, flash memory, or any suitable device for storing electronic data, and may be organized as a object-oriented or relational database. The data storage may maintain hierarchical data structures containing information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The servers 510 and 515 may communicate with client terminal(s) 521, 523, 524, 526 and portable device(s) 531 via network connections 540 and 542. The client terminals 521, 523, 524 and 526 may include a processor, display device, and data storage device, such as a hard disk (all not shown). The client terminals 521, 523, 524 and 526 may participate in execution of program instructions for business applications and/or business application UIs. The portable device 531 may be a smartphone, personal digital assistant, tablet, notebook or mini-notebook computer capable of wired and/or wireless communication. The portable device 531 may include memory, a processor, input device, display, and devices that enable wired or wireless communication.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium may include electronic circuits, semiconductor memory device, ROM, flash memory, erasable ROM (EROM), floppy diskette, CD-ROM, optical disk, hard disk, fiber optic medium, any electromagnetic storage device, or optical. The code segments may be downloaded via computer networks such as Internet, Intranet, etc. The disclosed embodiments may be used in a semantic business application solution to support context-related search in SAP business applications (e.g., SAP ERP, SAP CRM, etc.) and/or non-SAP systems. The business knowledge provided by a semantic network can be used by all business applications, e.g. as a semantic extension.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for providing personalized controls for a semantic system, the method comprising:
    setting up, by a computer processor, an initial configuration for a local semantic network;
    defining, by the processor, business terms using semantic objects and semantic relations in the local semantic network, wherein the business terms are adapted to users of the local semantic network;
    providing, by the processor, a user interface for accessing the local semantic network;
    receiving, by the processor, a request for business data, the request including business terms;
    assessing, by the processor, a context of the business terms within the request using the local semantic network;
    transmitting, by the processor, the business terms to a central semantic network; wherein the central semantic network includes global business terminology classified for sub-groups of users;
    responsive to the transmitting, receiving, by the processor, an assessment of the context of the business terms by the central semantic network wherein the assessment by the central semantic network is based on a measurement by the central semantic network of a frequency of usage for the business terms by a user group to which a user of the local semantic network belongs;
    updating, by the processor, the semantic objects and relations for the business terms based on the assessment by each of the local and central semantic networks of the context and based on an additional assessment by a learnable contextual network, the learnable contextual network extending the semantic relations for the business terms based on cyclical updates of perceptrons of a neural network; and
    updating, by the processor, the personalized controls of the user interface based on the updated semantic objects and relations.

2. The method of claim 1, the providing further comprising:
    providing, by the processor, a client application having a controller to control display of information to the user interface and to interact with a semantic controller.

3. The method of claim 1, wherein the initial configuration for the local semantic network is imported from a predetermined set of business objects.

4. The method of claim 1, wherein the semantic objects and relations include at least one of: user preference information based on user roles; knowledge domains for the business terms; indicators indicating importance of business terms based on user roles; contextual relationships for business terms.

5. A non-transitory machine readable storage medium embodied with computer instructions for causing a processor to execute a process for providing personalized controls for a semantic system, the process comprising:
    setting up an initial configuration for a local semantic network;
    defining network business terms using semantic objects and semantic relations in the local semantic network, wherein the network business terms are adapted to users of the local semantic network;
    providing a user interface to access the local semantic network;
    receiving a user request for business data, the request including query business terms;
    assessing a context of the query business terms within the user request using the local semantic network and a central semantic network, wherein the central semantic network includes global business terminology classified for sub-groups of users wherein the assessment is based on a measurement of a frequency of usage for the business terms by a user group to which a user of the local semantic network belongs;
    updating the semantic objects and relations for the network business terms based on the context and based on an additional assessment by a learnable contextual network, the learnable contextual network extending the semantic relations for the business terms based on cyclical updates of perceptrons of a neural network; and
    updating controls of the user interface based on the updated semantic objects and relations.

6. The non-transitory machine readable storage medium of claim 5, wherein the process further comprises:
    providing a client application to control display of the controls to the user interface.

7. The non-transitory machine readable storage medium of claim 5, wherein the local semantic network is co-located with the user interface.

8. The non-transitory machine readable storage medium of claim 5, wherein the central semantic network is remote from the user interface.

9. The non-transitory machine readable storage medium of claim 8, wherein the process further comprising:
    dispatching the user request to the remote central semantic network to assess the semantic objects and relations.

10. The non-transitory machine readable storage medium of claim 5, wherein the initial configuration for the local semantic network is extracted from a predetermined set of business objects.

11. The non-transitory machine readable storage medium of claim 5, wherein the semantic objects and relations include at least one of: user preferences information based on user roles; knowledge domains for the business terms; indicators indicating importance of business terms based on user roles; contextual relationships for business terms.

12. A system for providing a personalized semantic controls, the
system comprising:
a local database for storing business data related to an enterprise, the local database including a local semantic network;
a central database for storing business data related to the enterprise, the central database including a central semantic network;
a user input-output device coupled to the database;
a processor responsive to inputs from the user input device and coupled to the local database, the processor configured to:
set up an initial configuration for the local semantic network;
build objects and relations in the local semantic network;
receive a user request for business data;
assess a context of the business data using the local semantic network;
retrieve, using a semantic dispatcher, an assessment of the context of the business data by a central semantic network wherein the assessment is based on a measurement of a frequency of usage for the business terms by a user group to which a user of the local semantic network belongs;
update indexes and semantic indexes based on the assessment by each of the local and central semantic networks, wherein the indexes are used to search the objects in the semantic network and the semantic indexes are used to search the relations in the semantic network and based on an additional assessment by a learnable contextual network, the learnable contextual network extending the semantic relations for the business terms based on cyclical updates of perceptrons of a neural network; and
update controls of the user input-output device based on the updated indexes and semantic indexes.

13. The system of claim 12, wherein the processor is further configured to:
retrieve a document from the local semantic network that matches the user request;
receive markups or bookmarks for the document; and
update indexes and semantic indexes with the user markups or bookmarks.

14. The system of claim 12, wherein the local semantic network is co-located with the user input-output device.

15. The system of claim 12, wherein the central semantic network is remote from the user input-output device.

16. The system of claim 12, wherein the semantic indexes includes at least one of: user preference information based on user roles; knowledge domains for business terms; indicators indicating importance of business terms based on user roles; contextual relationships for business terms.

17. A system to provide personalized
semantic controls for a user interface, comprising:
a database for storing business data related to an enterprise, wherein the user interface is coupled to the database;
a processor responsive to inputs from the user interface and coupled to the database, the processor configured to:
set up an initial configuration for a local semantic network, build semantic objects and relations for a plurality of business terms in the local semantic network, wherein the semantic objects and relations include user preference information based on one or more user role;
receive a user request to the user interface for business data, the request to include one or more business terms;
assess the one or more business terms within the user request, wherein the assessment is to determine a knowledge domain, context, concept, and term type for the one or more business terms based on user roles of the user request, said assessment of context of the one or more business terms uses the local semantic network and a central semantic network, wherein the central semantic network includes global business terminology classified for sub-groups of users and wherein the assessment is based on a measurement of a frequency of usage for the business terms by a user group to which a user of the local semantic network belongs;
update the semantic objects and relations in the semantic network for the one or more business terms based on the user request assessment and based on an additional assessment by a learnable contextual network, the learnable contextual network extending the semantic relations for the business terms based on cyclical updates of perceptrons of a neural network; and
update the controls of the user interface based on the updated semantic objects and relations.

\* \* \* \* \*